(12) United States Patent
Lee

(10) Patent No.: US 7,443,534 B2
(45) Date of Patent: Oct. 28, 2008

(54) VIDEO CLOCK GENERATION APPARATUS AND METHOD

(75) Inventor: Kwon-Cheol Lee, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 653 days.

(21) Appl. No.: 11/179,465

(22) Filed: Jul. 13, 2005

(65) Prior Publication Data
US 2006/0017984 A1    Jan. 26, 2006

(30) Foreign Application Priority Data
Jul. 20, 2004    (KR)    ....................... 10-2004-0056419

(51) Int. Cl.
G06F 15/00 (2006.01)
G06K 1/00 (2006.01)
G06K 15/12 (2006.01)
G06F 3/12 (2006.01)

(52) U.S. Cl. ........................................ 358/1.7; 358/1.1

(58) Field of Classification Search ................. 358/1.1, 358/1.7, 1.13, 410; 346/157, 160; 355/202, 355/204, 326; 347/111
See application file for complete search history.

(56) References Cited

U.S. PATENT DOCUMENTS 4,885,596 A * 12/1989 Egawa et al. ................. 347/111
5,471,176 A    11/1995 Henson et al.
6,204,694 B1    3/2001 Sunter et al.
2003/0218511 A1    11/2003 Katakura et al.

FOREIGN PATENT DOCUMENTS

| EP | 0440389 A2 | 8/1991 |
| JP | 64-077329 | 3/1989 |
| KR | 1992-15860 | 8/1992 |

\* cited by examiner

Primary Examiner—Douglas Q Tran
(74) Attorney, Agent, or Firm—Roylance, Abrams, Berdo & Goodman, LLP

(57) ABSTRACT

A video clock generation apparatus and method are provided. The apparatus comprises a ring oscillator for generating an oscillation frequency; a loopspeed detection unit for detecting a loopspeed that represents the number of pulses generated at the oscillation frequency when the ring oscillator oscillates for a predetermined time; and a video clock generation unit for suppressing generation of front-end video clock signals for a predetermined initial time, and after a first predetermined time following initialization of the effective video clock signals, maintaining a clock state of back-end video clock signals for a second predetermined time, wherein the front-end video clock signals precede effective video clock signals for image formation and the back-end video clock signals follow the effective video clock signals, and wherein the maintained clock state is the clock state prior to the second predetermined time clock signals.

6 Claims, 3 Drawing Sheets

VIDEO CLOCK GENERATION APPARATUS AND METHOD

CROSS-REFERENCE TO RELATED APPLICATION

This application claims the benefit under 35 U.S.C. §119(a) of Korean Patent Application No. 10-2004-0056419, filed on Jul. 20, 2004, in the Korean Intellectual Property Office, the entire disclosure of which is hereby incorporated by reference.

BACKGROUND OF THE INVENTION

1. Field of the Invention

The present invention relates to an image formation apparatus such as a color laser beam printer using a plurality of laser scanning units (LSU). More particularly, the present invention relates to a video clock generation apparatus and a method of removing distortions, such as, errors in video clock signals, produced at the time of generating the video clock signals to compensate for color registration and an offset in laser scanning units of an image formation apparatus.

2. Description of Related Art

A conventional image formation apparatus, such as a color laser beam printer, includes a ring oscillator, a video clock generation apparatus, a control logic unit, and a multiplexer.

The ring oscillator generates a predetermined oscillation frequency. The video clock generation apparatus uses the oscillation frequency generated by the ring oscillator to generate a video clock signal. The control logic and the multiplexer are responsible for preventing errors, such as clock errors preceding and following an effective video clock period required to form images during the appropriate video clock signals.

The video clock generation apparatus may generate an abnormal video clock signal when attempting to stabilize the loopspeed signal to generate video clock signals. In addition, an abnormal video clock signal is also generated due to the initialization of the video clock signals for rearranging the main scanning direction of the image formation after the effective video clock period. Some video clock signals, in which the errors are produced during the generation of the video clock signals, cause a negative effect on the operations involving image data and processing image formation data, so that such abnormal video clock signals may cause severe image distortion to the image.

Conventionally, the control logic and the multiplexer have been used to convert front-end and back-end video clock signals into system clock signals to remove errors produced during a front-end video clock period preceding the effective video clock period and a back-end video clock period following the effective video clock period, so that the video clock signals can be generated without errors.

FIG. 1 is a timing diagram showing an example of a conventional system clock (SysClk) and video clock signals (VClk1 and VClk2). As shown in FIG. 1, the system clock SysClk is periodically generated, and the first video clock signal VC1k1 is generated by the video clock generation apparatus. Clock errors corresponding to an abnormal video clock are produced in the front-end and back-end video clock periods of the first video clock signal VC1k1. To remove the errors, the control logic generates the second video clock signal VClk2 by converting the first video clock signal VC1k1 during the front-end and back-end video clock periods to match the system clock SysClk.

Alternatively, the conversion of the front-end and back-end video clock signals into the system clock signals may produce errors. Therefore, there is a problem in that the errors produced by the clock conversion may cause a malfunction in the resolution enhancement technology (RET) for processing images.

SUMMARY OF THE INVENTION

The present invention provides a video clock signal generation apparatus for preventing clock errors produced by video clock signal generation for image formation in an image formation apparatus.

The present invention also provides a video clock generation method for preventing clock errors produced by video clock signal generation for image formation in an image formation apparatus.

According to an aspect of the present invention, there is provided a video clock generation apparatus comprising a ring oscillator for generating an oscillation frequency; a loopspeed detection unit for detecting a loopspeed, wherein the loopspeed represents the number of pulses in which the oscillation frequency generated by the ring oscillator is oscillated for a predetermined time. A video clock generation unit is provided for suppressing clock generation of front-end video clock signals for a predetermined initial time period. After a first predetermined time period following the initialization of the effective video clock signals, the video clock generation unit maintains the clock state of the back-end video clock signals for a second predetermined time, wherein the front-end video clock signals precede the effective video clock signals for image formation and the back-end video clock signals follow the effective video clock signals. The maintained clock state is the clock state prior to the second predetermined time period.

According to another aspect of the present invention, there is provided a video clock generation method beginning with the step of suppressing clock signal generation of front-end video clock signals preceding an effective video clock signal for image formation for a predetermined initial time period. After the predetermined initial time period, the front-end video clock signals and the effective video clock signals are generated after the generation of the front-end video clock signals. When after a first determined time period in which the effective video clock signals are initialized and a clock state of back-end video clock signals is maintained following the effective video clock signals for a second predetermined time period, wherein the clock state is the clock state that appears prior to the second predetermined time period. Finally, after the second predetermined time period, the back-end video clock signals are generated.

BRIEF DESCRIPTION OF THE DRAWINGS

The above and other features and advantages of the present invention will become more apparent by describing in detail exemplary embodiments thereof with reference to the attached drawings in which.

It should be understood that throughout the drawings like reference numbers refer to like features, structures, and elements.

DETAILED DESCRIPTION OF EXEMPLARY EMBODIMENTS

Now, a video clock generation apparatus according to an embodiment of the present invention will be described with reference to the attached drawings.

Figure 1:
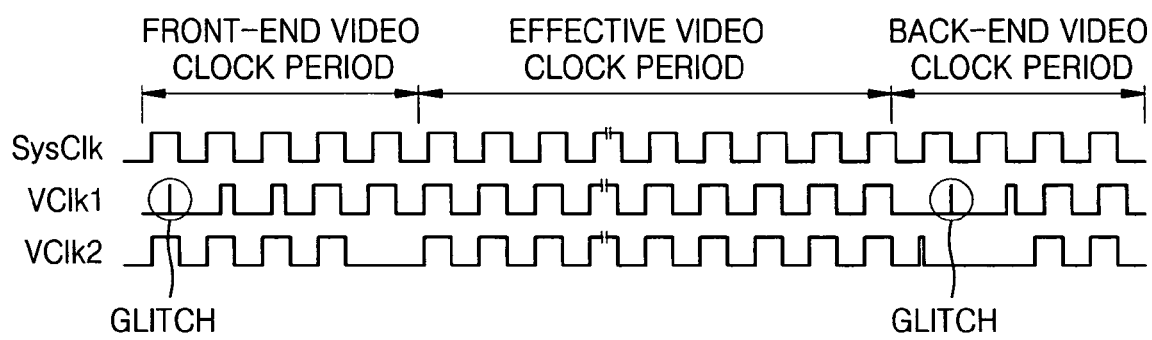
FIG. 1 is a timing diagram showing an example of a conventional system clock SysClk and video clock signals VClk1 and VClk2.
Figure 2:
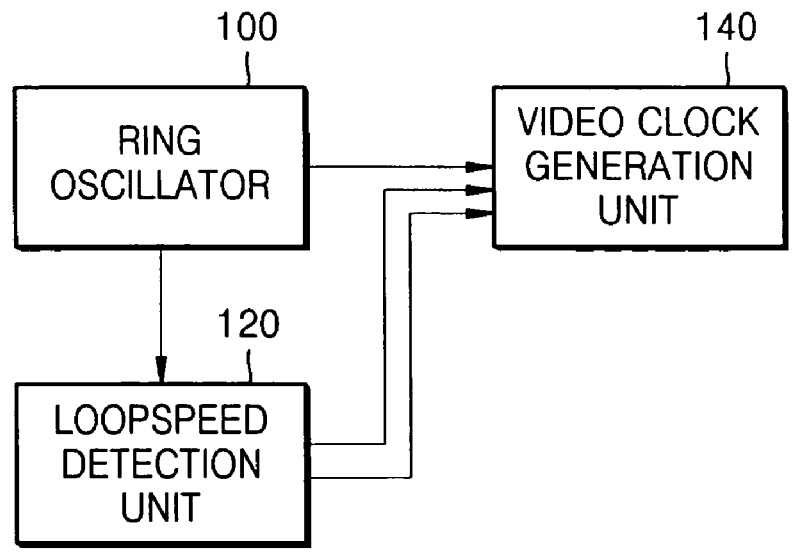
FIG. 2 is a block diagram of a video clock generation apparatus according to an embodiment of the present invention.

FIG. 2 is a block diagram of a video clock generation apparatus according to an embodiment of the present invention. The video clock generation apparatus comprises a ring oscillator 100, a loopspeed detection unit 120, and a video clock generation unit 140.

The ring oscillator 100 generates an oscillation frequency. To modulate video clock signals having more than tens of MHz, a frequency higher than that of the video clock signals is required. For this reason, the ring oscillator 100 is used. The ring oscillator 100 comprises an odd number of inverter chains. Ideally, one inverter can operate as one tap. In this case, an exact signal between taps cannot be obtained due to a difference between transition times depending on the logic states. In particular, when other devices in the modulator are driven by using tap signals, there occurs a violation of setup/hold time conditions of the memory cells, such as flip-flops. To meet the above conditions, three or five inverters are connected in series to form one converter block that in turn forms one tap. The ring oscillator 100 is sensitive to noise so that its oscillation frequency may vary according to a certain operation, temperature, and/or voltage.

The oscillation frequency generated by the ring oscillator is output to the loopspeed detection unit 120 and the video clock generation unit 140.

The loopspeed detection unit 120 detects a loopspeed representing the number of pulses oscillated at the oscillation frequency generated by the ring oscillator for a predetermined unit time. Here, the predetermined unit time refers to a time period of a system clock generated by the image formation apparatus. The loopspeed detection unit 120 detects the loopspeed, that is, the number of pulses oscillated at the oscillation frequency for one period of the system clock, and outputs the detected loopspeed to the video clock generation unit 140.

The frequency of the video clocks may or may not be about the same frequency as the system clock. Preferably, the effective video clock period corresponds to one horizontal scan line of a laser printer.

Further, the loopspeed detection unit 120 generates a control signal for suppressing the generation of the front-end video clock signals for a predetermined initial time and outputs the generated control signal to the video clock generation unit 140. Here, the front-end video clock signals refer to video clock signals preceding the effective video clock signals for image formation. The control signal is a signal for suppressing the generation of the video clock signals until the loopspeed is stabilized. The predetermined initial time refers to a time when the ring oscillator 100 and the loopspeed are stabilized. Preferably, since the ring oscillator 100 and the loopspeed are normally stabilized in "8" clock cycles of the system clock, the predetermined initial time is approximately set to "8" clock signal cycles, and more preferably, to "16" clock signal cycles after the generation of the oscillation frequency by the ring oscillator 100. Therefore, the control signal can preferably be used to suppress generation of the front-end video clock signals during the "8" or "16" clock signal cycles corresponding to the front-end predetermined initial time.

The video clock generation unit 140 suppresses the generation of the front-end video clock signals preceding the effective video clock signals for image formation for a predetermined initial time. After a first predetermined time after initializing the clock states of the effective video clock signals, the video clock generation unit 140 maintains the clock state of the back-end video clock signals for a second predetermined time. Here, the clock state refers to the clock state prior to the second predetermined time.

Figure 3:
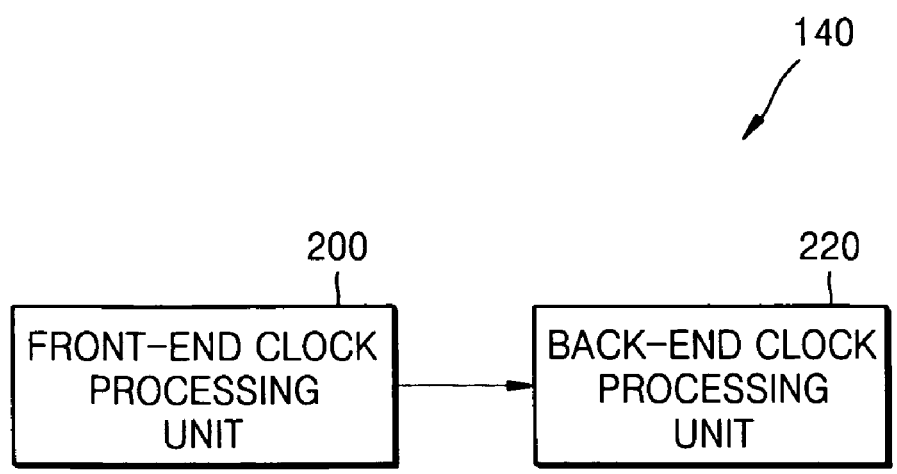
FIG. 3 is a block diagram of a video clock generation unit according to an embodiment of the present invention as shown in FIG. 2.

FIG. 3 is a block diagram of a video clock generation unit 140 according to an embodiment of the present invention, which comprises a front-end clock processing unit 200 and a back-end clock processing unit 220.

The front-end clock processing unit 200 suppresses generation of the front-end video clock signals for the predetermined initial time, depending on the control signal received from the loopspeed detection unit 120, and generates the front-end video clock signals after the predetermined initial time.

In response to the control signal received from the loopspeed detection unit 120, the front-end video clock processing unit 200 suppresses the generation of the front-end video clock signals for the predetermined initial time after frequency oscillation of the ring oscillator 100. The clock generation is suppressed for the predetermined initial time is to remove clock errors possibly produced from the front-end video clock signals. Therefore, the clock errors potentially produced from the front-end video clock signals are prevented in advance, so that the quality of image formation can be maintained.

After the predetermined initial time, the front-end video clock processing unit 200 generates the front-end video clock signals depending on the oscillation frequency received from the ring oscillator 100 and the loopspeed detected by the loopspeed detection unit 120. The front-end video clock processing unit 200 outputs the front-end video clock signals generated to the back-end video clock processing unit 220.

Figure 4:
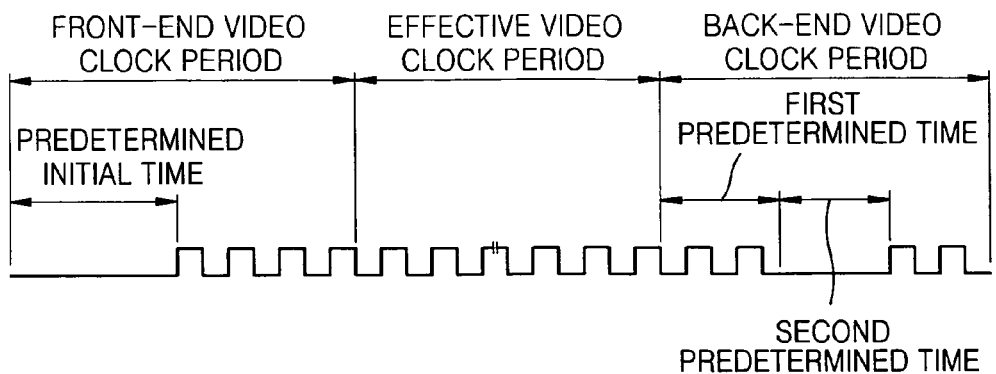
FIG. 4 is an exemplary timing diagram of video clock signals generated according to an embodiment of the present invention.

FIG. 4 is a timing diagram showing an example of video clock signals generated according to an embodiment of the present invention. It can be understood that the generation of the front-end video clock signals is suppressed for the predetermined initial time during the front-end video clock period, and the front-end video clock signals are generated, after the predetermined initial time.

The back-end clock processing unit 220 generates the back-end video clock signals for the first predetermined time after initialization of the effective video clock signals, and maintains the clock state of the back-end video clock for the second predetermined time where the clock state is one prior to the second predetermined time, and generates the back-end video clock signals again after the second predetermined time.

After the initialization of the effective video clock signals for rearranging a main scanning direction of the image formation, the back-end video clock processing unit 220 generates the back-end video clock signals for the first predetermined time depending on the oscillation frequency received from the ring oscillator 100 and the loopspeed detected by the loopspeed detection unit 120. Next, the back-end video clock processing unit 220 maintains the clock state of the back-end video clock for the second predetermined time where the clock state is one prior to the second predetermined time.

Following the initialization of the effective video clock signals, errors may be produced after a certain time. Therefore, embodiments of the present invention block the errors in advance by maintaining the former video clock state for the video clock signals when the errors are produced. Accordingly, in order to maintain the clock state at the end of first predetermined time, the back-end video clock processing unit 220 processes the back-end video clock signals for the second predetermined time. For example, the clock state maintains low levels at the end of the first predetermined time and the beginning of the second predetermined time, so that the clock signals of the back-end video clock maintain a low level for the second predetermined time, as shown in FIG. 4.

After the second predetermined time, the back-end video clock processing unit 220 generates the back-end video clock signals again, depending on the oscillation frequency received from the ring oscillator 100 and the loopspeed detected by the loopspeed detection unit 120.

Now, a video clock generation method according to an embodiment of the present invention will be described with reference to the FIG. 5.

Figure 5:
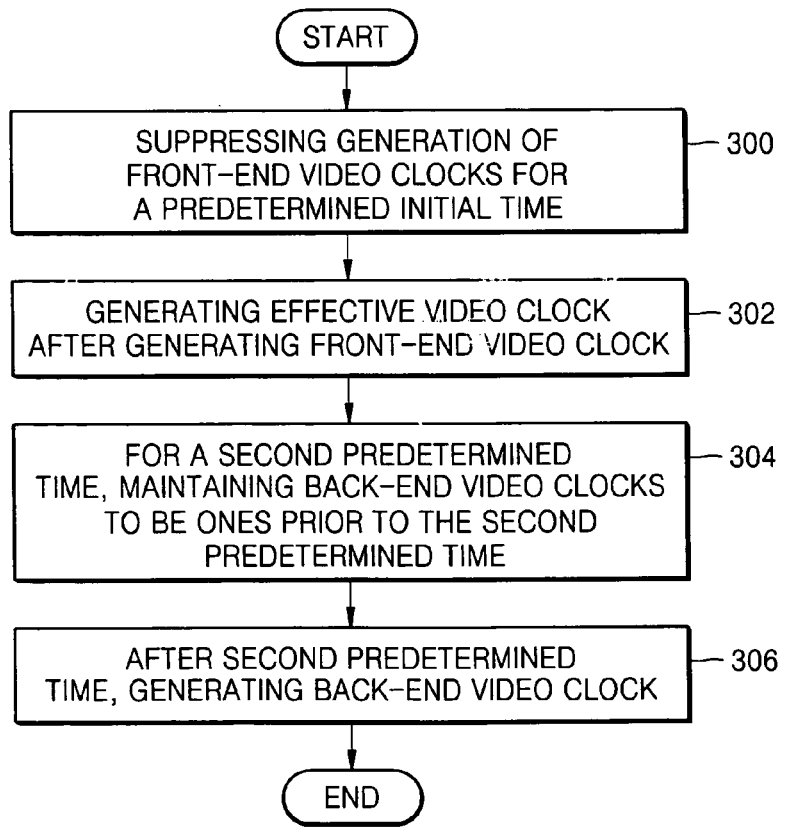
FIG. 5 is a flowchart of a video clock generation method according to an embodiment of the present invention.

FIG. 5 is a flowchart of a video clock generation method according to an embodiment of the present invention. The method comprises the steps of suppressing generation of the front-end video clock signals for a predetermined initial time; and maintaining the clock states of the back-end video clock signals for a second predetermined time where the clock states are the clock states prior to the second predetermined time (operations S300 to S306).

First, generation of the front-end video clock signals preceding the effective video clock signals for image formation is suppressed for the predetermined initial time (operation S300). At this time, the predetermined initial time refers to a time to which the ring oscillator 100 and the loopspeed are stabilized.

Following the operation S300, the front-end video clock signals are generated after the predetermined initial time, and after the generation of the front-end video clock signals, the effective video clock signals are generated (operation S302). The front-end video clock signals are generated, depending on the oscillation frequency received from the ring oscillator 100 and the loopspeed detected by the loopspeed detection unit 120, and after the generation of the front-end video clock signals, the effective video clock signals for image formation are generated.

Following the operation S302, after the initialization of the effective video clock signals, the back-end video clock signals following the effective video clock signals maintain the former clock states of the back-end video clock signals for the second predetermined time next to the first predetermined time (operation S304).

Following the initialization of the effective video clock signals, clock errors may be produced after a certain time. Typically, errors are produced after the certain time following the initialization of the effective video clock signals. Therefore, when the effective video clock signals are initialized to rearrange the main scanning direction of the image formation, the back-end video clock signals are generated for the first predetermined time, and then, the back-end video clock signals maintain the former clock state of the back-end video clock signals for the second predetermined time. In other words, the clock errors are prevented by having the clock state of the back-end video clock maintain the video clock state at the end of the first predetermined time, for the second predetermined time corresponding to the moment the glitches are produced.

Following the operation S304, the back-end video clock signals are generated after the second predetermined time (operation S306). After the second predetermined time, the back-end video clock signals are generated again, depending on the oscillation frequency received from the ring oscillator 100 and the loopspeed detected by the loopspeed detection unit 120.

According to an embodiment of the present invention, a video clock generation apparatus and method for preventing clock errors, such as errors of the video clock signals, produced by generating video clock signals for image formation in image formation apparatuses, such as laser beam printers, are disclosed. Therefore, it is possible to provide images with good quality.

While embodiments of the present invention for the video clock generation apparatus and method have been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the embodiments of the present invention.

What is claimed is:

1. A video clock generation apparatus comprising:
   a ring oscillator for generating an oscillation frequency;
   a loopspeed detection unit for detecting a loopspeed representing the number of pulses generated at the oscillation frequency when the ring oscillator oscillates for a predetermined unit time; and
   a video clock generation unit for suppressing generation of front-end video clock signals for a predetermined initial time, and after a first predetermined time following initialization of effective video clock signals, maintaining the clock state of back-end video clock signals for a second predetermined time, wherein the front-end video clock signals precede the effective video clock signals for image formation and the back-end video clock signals follow the effective video clock signals, and wherein the maintained clock state is the clock state prior to the second predetermined time.

2. The video clock generation apparatus according to claim 1, wherein the loopspeed detection unit generates a control signal suppressing the generation of the front-end video clock signals and outputs the generated control signal to the video clock generation unit.

3. The video clock generation apparatus according to claim 2, wherein the video clock generation apparatus comprises:
   a front-end video clock processing unit for suppressing generation of the front-end video clock signals for the predetermined initial time depending on the control signal received from the loopspeed detection unit, and generating the video clock signals after the predetermined initial time; and
   a back-end video clock processing unit for generating the video clock signals for the first predetermined time after initialization of the effective video clock signals, maintaining the clock state of the back-end video clock for the second predetermined time, and generating the back-end video clock signals again after the second predetermined time, wherein the clock state is the clock state prior to the second predetermined time.

4. The video clock generation apparatus according to claim 3, wherein the video clock generation apparatus is included in a color laser beam printer.

5. A video clock generation method comprising the steps of:

(a) suppressing a clock generation of a front-end video clock signal preceding an effective video clock signal for image formation for a predetermined initial time;

(b) after the predetermined initial time, generating the front-end video clock signal and generating the effective video clock signal after the generation of the front-end video clock signal;

(c) after a first predetermined time after initializing the effective video clock signal, maintaining a clock state of back-end video clock signal following the effective video clock signal for a second predetermined time, wherein the clock state is the clock state prior to the second predetermined time; and (d) after the second predetermined time, generating the back-end video clock signal.

6. The video clock generation method of claim 5, wherein step (a) comprises receiving a control signal to suppress generation of the front-end video clock form a loopspeed detection unit.

\* \* \* \* \*